(12) United States Patent
Owens

(10) Patent No.: US 8,400,948 B2
(45) Date of Patent: Mar. 19, 2013

(54) METHOD AND SYSTEM FOR UPDATING REAL-TIME DATA BETWEEN INTERVALS

(75) Inventor: Robert Owens, Franklin, TN (US)

(73) Assignee: Aspect Software Inc., Chelmsford, MA (US)

( * ) Notice: Subject to any disclaimer, the term of this patent is extended or adjusted under 35 U.S.C. 154(b) by 415 days.

(21) Appl. No.: 11/038,566

(22) Filed: Jan. 18, 2005

(65) Prior Publication Data

US 2006/0159027 A1    Jul. 20, 2006

(51) Int. Cl.
*H04Q 11/00*    (2006.01)

(52) U.S. Cl. ......................................... 370/270

(58) Field of Classification Search .......... 370/352–356, 370/252, 254, 259, 265, 270
See application file for complete search history.

(56) References Cited

U.S. PATENT DOCUMENTS

| | | | | |
|---|---|---|---|---|
| 4,737,983 A | * | 4/1988 | Frauenthal et al. | 379/266.08 |
| 5,325,292 A | * | 6/1994 | Crockett | 705/9 |
| 5,335,268 A | * | 8/1994 | Kelly et al. | 379/112.05 |
| 5,530,744 A | | 6/1996 | Charalambous et al. | |
| 5,546,455 A | | 8/1996 | Joyce et al. | |
| 5,555,179 A | | 9/1996 | Koyama et al. | |
| 5,633,924 A | * | 5/1997 | Kaish et al. | 379/266.03 |
| 5,765,033 A | | 6/1998 | Miloslavsky | |
| 5,926,539 A | | 7/1999 | Shtivelman | |
| 5,940,494 A | | 8/1999 | Rafacz et al. | |
| 5,946,387 A | | 8/1999 | Miloslavsky | |
| 5,953,332 A | | 9/1999 | Miloslavsky | |
| 5,953,405 A | | 9/1999 | Miloslavsky | |
| 6,002,760 A | | 12/1999 | Gisby | |
| 6,021,428 A | | 2/2000 | Miloslavsky | |
| 6,044,145 A | | 3/2000 | Kelly et al. | |
| 6,044,368 A | | 3/2000 | Powers | |
| 6,067,357 A | | 5/2000 | Kishinsky et al. | |
| 6,108,711 A | | 8/2000 | Beck et al. | |
| 6,138,139 A | | 10/2000 | Beck et al. | |
| 6,157,655 A | | 12/2000 | Shtivelman | |
| 6,167,395 A | | 12/2000 | Beck et al. | |
| 6,170,011 B1 | | 1/2001 | Beck et al. | |
| 6,175,563 B1 | | 1/2001 | Miloslavsky | |
| 6,175,564 B1 | * | 1/2001 | Miloslavsky et al. | 370/352 |
| 6,185,292 B1 | | 2/2001 | Miloslavsky | |
| 6,256,620 B1 | | 7/2001 | Jawahar et al. | |
| 6,263,049 B1 | | 7/2001 | Kuhn | |
| 6,263,065 B1 | * | 7/2001 | Durinovic-Johri et al. | 379/266.03 |
| 6,345,305 B1 | | 2/2002 | Beck et al. | |

(Continued)

FOREIGN PATENT DOCUMENTS

EP    0993170 1    4/2000
WO    WO98/42118    9/1998

(Continued)

*Primary Examiner* — Jeffrey M Rutkowski
*Assistant Examiner* — Juvena Loo
(74) *Attorney, Agent, or Firm* — Husch Blackwell LLP (57) ABSTRACT

A method for updating real-time data between intervals in a communication processing center, having a data source and a data collector, includes receiving, at the data collector, real-time data at intervals from a data source. The real-time data includes information on the availability of aspects of a communication network. The received real-time data is stored in a memory. The occurrence of a specified triggering event between the intervals is detected. The stored real-time data is updated based on information relating to the specified triggering event.

52 Claims, 7 Drawing Sheets

U.S. PATENT DOCUMENTS

| | | |
|---|---|---|
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,584,191 B1 * | 6/2003 | McPartlan et al. ....... 379/265.02 |
| 6,597,777 B1 * | 7/2003 | Ho ............................... 379/133 |
| 6,611,498 B1 * | 8/2003 | Baker et al. ................... 370/252 |
| 6,707,904 B1 | 3/2004 | Judkins et al. |
| 6,732,156 B2 | 5/2004 | Miloslavsky |
| 6,850,613 B2 * | 2/2005 | McPartlan et al. ....... 379/265.02 |
| 6,970,552 B1 * | 11/2005 | Hahn et al. ............... 379/265.02 |
| 7,242,686 B1 * | 7/2007 | Dougherty et al. ......... 370/395.4 |
| 7,457,403 B2 * | 11/2008 | Culp et al. ................ 379/265.01 |
| 7,929,685 B1 * | 4/2011 | Boyet et al. .............. 379/265.02 |
| 2002/0021693 A1 * | 2/2002 | Bruno et al. ................... 370/386 |
| 2003/0215083 A1 * | 11/2003 | McPartlan et al. ....... 379/265.02 |
| 2005/0129217 A1 * | 6/2005 | McPartlan et al. ....... 379/266.08 |
| 2007/0003050 A1 * | 1/2007 | Ebling et al. ............. 379/265.02 |

FOREIGN PATENT DOCUMENTS

| | | |
|---|---|---|
| WO | WO 02/035804 A3 | 5/2002 |

* cited by examiner

METHOD AND SYSTEM FOR UPDATING REAL-TIME DATA BETWEEN INTERVALS

THIS application relates to a method and system for updating real-time data between intervals for use in a communication processing center.

BACKGROUND OF THE INVENTION

Real-time data is usually collected in communication processing centers, such as contact centers, at pre-defined intervals. The collected data is stored in a database and then used by a router when determining how a received communication request must be routed to one of multiple communication distributors.

It will be appreciated that, in systems where real-time data is conveyed only at pre-defined intervals, the validity of the collected data typically degrades between the intervals. In a system where data is collected every ten seconds, data may be considered somewhat out-of-date after 5 seconds, and may be considered completely out-of-date after 9 seconds, just before the data is updated again at 10 seconds. For example, in a contact center system where two call distributors are used, the first call distributor may have five available agents and the second call distributor may have four available agents at time $t_0$. At the first collection interval, $t_0$, real-time data (e.g., a number of available agents) is collected from the call distributors. If the contact center receives a contact request (e.g., a call) at $t_2$, a router is prompted for a route decision. As the router uses the real-time data collected at $t_0$, the first call distributor with the five available agents will be selected as the destination. When this call arrives at the first call distributor, it is assigned to an agent leaving only four available agents. However, the stored real-time data still indicates that five agents are available. It will be appreciated that routing based on this data would result in all calls being sent to the first call distributor for the entire interval between collections.

One of the possible solutions identified to increase the validity of the data is to decrease the time interval for collecting real-time data. However, as available bandwidth creates limitations for the application of this solution, the solution has proved to be less than satisfactory. In some cases, it has been impossible to decrease the time interval sufficiently thereby to accommodate the required rate of change of data. For example, it is not unusual to have bursts of ten to fifteen calls per second in a contact center domain. To accurately convey information relating to these calls, the collection interval would need to be no more than 100 milliseconds. However, it would be extremely difficult to accommodate this timing requirement in a typical Wide Area Network (WAN).

SUMMARY OF THE INVENTION

According to a first aspect of the invention there is provided a method for updating real-time data between intervals in a communication processing center having a data source and a data collector, the method comprising
    receiving, by the data collector, real-time data at intervals from a data source, the real-time data including information on the availability of aspects of a communication network;
    storing the received real-time data in memory means;
    detecting the occurrence of a specified triggering event between the intervals; and
    updating the stored real-time data based on information relating to the specified triggering event.

According to a further aspect of the invention there is provided a method for updating real-time data between intervals in a communication processing center having a data source and a data collector, the method comprising
    receiving, by the data collector, real-time data at intervals from a data source, the real-time data including information on the availability of aspects of a communication network;
    storing the received real-time data in memory means; and
    updating the stored real-time data between the intervals based on a predictive algorithm.

DETAILED DESCRIPTION OF THE INVENTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
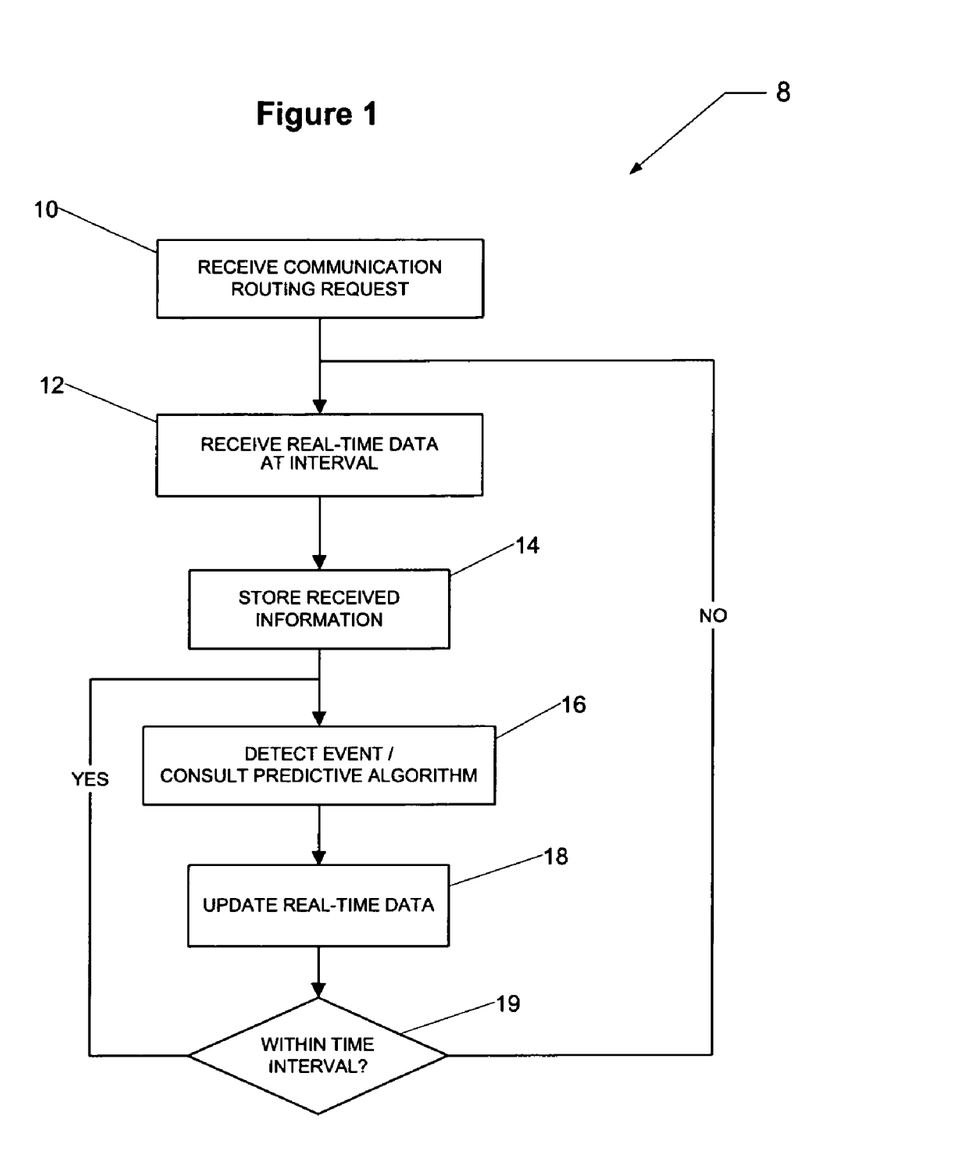
FIG. 1 is a flow diagram of a method for updating real-time data between intervals in a communication processing center according to an exemplary embodiment of the present invention.

Turning to the flow diagram of FIG. 1, a method, indicated generally at reference 8 for updating real-time data between intervals in a communication processing center (e.g., a contact center) comprises a first operation 10 of receiving a communication routing request from a communication source. The communication processing center may be a contact center and the communication source may be a Public Switched Telephone Network (PSTN) carrier or may be a call distributor depending on the configuration of the communication processing center.

The routing request from the communication source is now handled by the communication processing center, which relies, amongst other information, on real-time data to route the call to a destination. As a second operation 12 of the method 8 shows, a data collector which forms part of the communication processing center, receives real-time data from the data source at intervals. The frequency of the data collection interval is typically constrained by physical limitations, such as the latency for transmitting information between communication processing centers as well as limited computational resources at the communication processing centers.

The real-time data includes information on the availability of aspects of a communication network. For example, in a contact center the data source provides information that enables the contact center to route a call to the next available operator in the center. Such information would typically relate to the longest available agent, queue lengths and average time to advance calls associated with a particular data source.

The received real-time data is now stored, in operation 14, in memory means such as a database of the communication center for later use in determining the availability of aspects of the communication network, or in particular the availability of an agent or operator.

While the communication processing center is operating between the collection intervals, the stored real-time data may be updated (operation 18) by a module which first detects the occurrence of a specified triggering event and then updates the stored real-time data based on information relating to this specified triggering event. Alternatively, an update of the stored real-time data may be based on a predictive algorithm that is applied on the real-time data between the collection intervals. This operation 16 of detecting a triggering event or consulting a predictive algorithm is described in greater detail below.

As long as the communication processing center is operating between collection intervals (operation 19), the specified triggering events and/or the predictive algorithm are used to update the latest real-time data collected. At the next collection interval, the data collector receives new real-time data from the data source and further updates based on triggering events or predictive algorithms will follow.

Figure 2A:
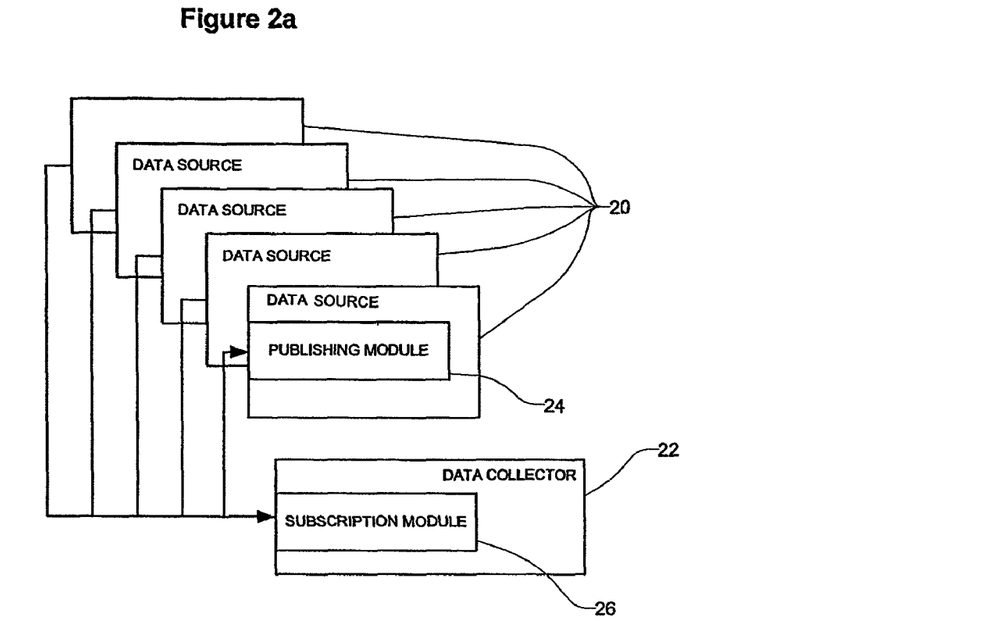
FIG. 2a and b are diagrammatic representations of two data transfer configurations between data sources and the data collector, according to an exemplary embodiment of the present invention.

Referring to FIG. 2a, multiple data sources 20 are seen interacting with the data collector 22 of the communication processing center. The data sources 20 are configured to include a publishing module 24 that makes use of push technology to provide the data collector 26 with information on aspects of the availability of the communication network. This information is sent automatically from the data sources 20 to the data collector 22 at regular or pre-defined intervals. Influencing factors for determining the collection frequency interval may include the anticipated rate of change of the data, the data source's computational resources for gathering and publishing the data, and the rate at which the infrastructure is capable of transmitting the data from the data source to the data collector. The data collector 22 in turn includes a subscription module 26 which receives the information provided by the publishing modules 24 of each data source 20.

Figure 2B:
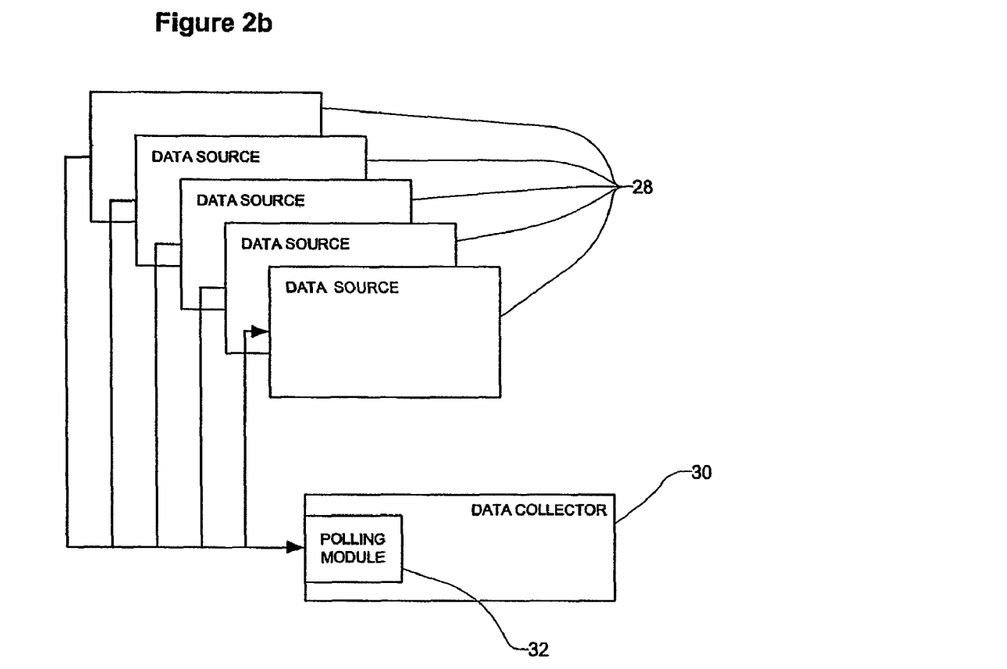

Turning to FIG. 2b, an alternative configuration of data interaction between the multiple data sources 28 and the data collector 30 is shown. In this configuration, the data collector 30 is configured to include a polling module 32 which makes use of pull technology to collect data from the various data sources at regular or pre-defined intervals.

Figure 3:
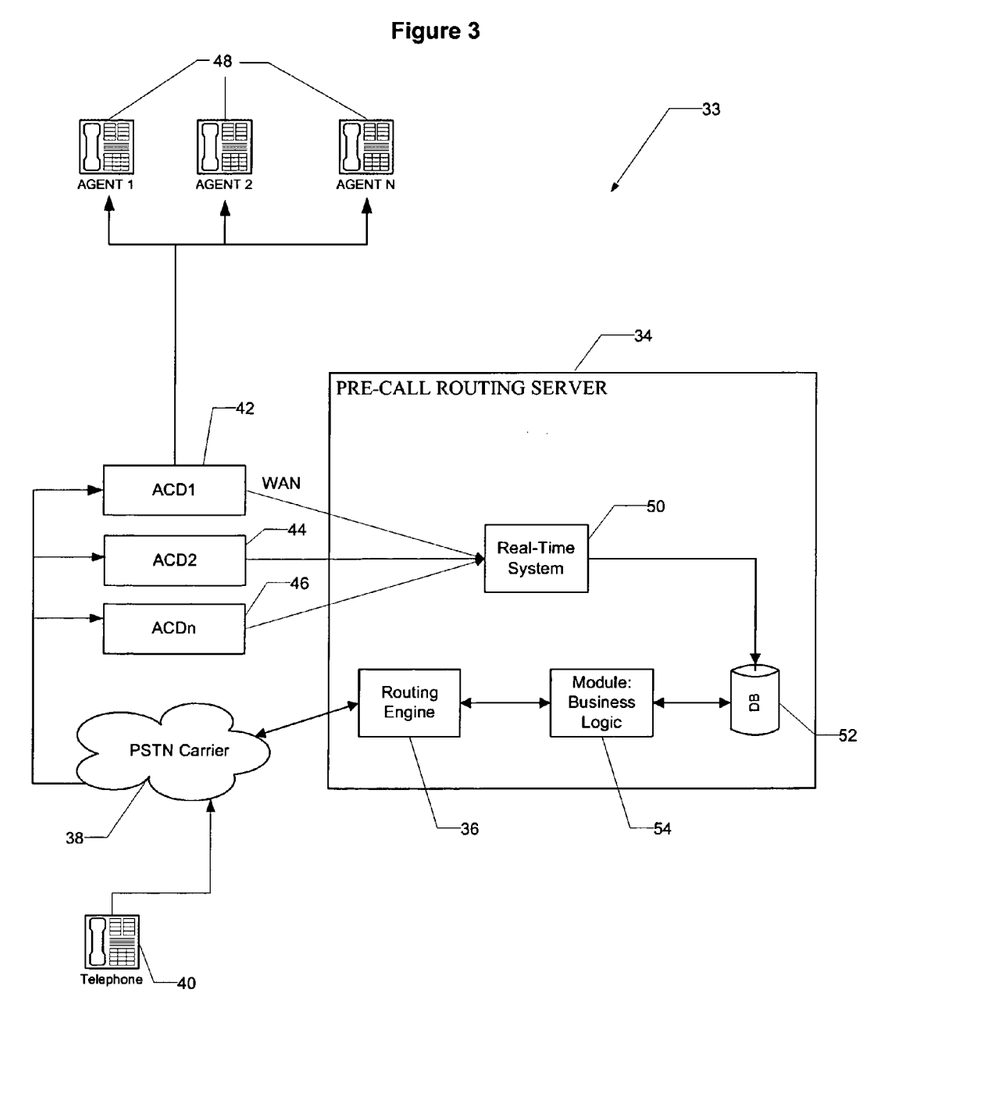
FIG. 3 is a block diagram illustrating a communication processing center configured to conduct pre-call routing, according to a first exemplary embodiment of the present invention.

A system, designated generally by the reference 33 for updating real-time data between intervals in a communication processing center according to an exemplary embodiment of the present invention is shown in FIG. 3. The communication processing center is used for pre-call routing in a contact center domain. The system 33 includes a routing server 34 hosting a routing engine 36 that receives a communication request from a communication source, typically a PSTN carrier 38. The routing engine 36 provides instructions to the carrier 38 on how to route a call, with the route decision ultimately being based on a business logic module 54 that accesses the stored information 52 and manipulates it according to certain rules. For example, when the carrier 38 receives a toll free call in the carrier's network 38, the carrier 38 sends a message to the routing engine 36 requesting a route decision. The routing engine 36 responds to the carrier 38 with a route decision, which ultimately directs the carrier 38 to send the call to a particular data source.

In the exemplary embodiment, the data sources are Automatic Call Distributors (ACDs) 42, 44 and 46. Each ACD has a number of agents 48 to which it can further route the call. The routing engine 36, through the business logic module 54, uses real-time data gathered from these ACDs 42, 44 and 46, as well as subsequent data relating to either a triggering event or predictive algorithm to make its routing decision.

The ACDs 42, 44 and 46 provide or feed real-time data at intervals to the real-time system (i.e. data collector) 50. As mentioned above, this data delivery may either be based on a push technology where the data source 42, 44 and 46 has a publishing module and the data collector has a subscription module, or on pull technology where the data collector has a polling module.

The data collector may, in one embodiment, be a real-time system (RTS) 50 which stores the collected real-time data in tables within memory device (e.g., a database) on the routing server. The stored data contains information on each ACD, such as longest available agent, queue lengths and average time to advance calls. After the communication source or Public Switched Telephone Network (PSTN) carrier 38 has sent a route request message to the routing engine 36, the routing engine 36 forwards call information (e.g., the dialed number, automatic number identification (ANI) and caller entered digits (if any)) received from the carrier 38 to the business logic module 54. The business logic module 52 is a graphical programming environment that provides for programming business logic. The business logic module 54 uses the real-time data stored in the database 52 to make route decisions. A component of the business logic module 54 is also responsible for detecting and updating the real-time data based on a triggering event or a predictive algorithm.

Revisiting the example used in the background, a contact center has two Automatic Call Distributors (ACDs), with ACD1 having five available agents at time to and ACD2 having four available agents at $t_0$. At the first collection interval, $t_0$, real-time data such as the number of available agents, is collected from the ACDs or data sources. In the event that the contact center receives a call at $t_2$, the routing engine 36 receives a request for a route decision. The routing engine 36, via the business logic module 54, now uses the real-time data collected at $t_0$, and the call is routed to ACD1 with the five available agents. This event of routing a call to an Automatic Call Distributor is one example of a triggering event for updating the real-time data. The communication processing center uses the business logic module 54 for detecting the occurrence of this specified triggering event and for updating the stored real-time data in the database based on information relating to the triggering event.

After the update based on the triggering event, the data stored in the database will show that both ACD1 and ACD2 have four agents available after the first call was routed. If a call arrives at $t_3$, it can now be routed to either ACD1 or ACD2, as both ACDs are recognized by the routing engine 36 as having four available agents. Assuming that this second call is routed to ACD1, the number of agents available for ACD1 will be decremented to three, based on the further triggering event of routing the second call. Similarly, should a call arrive at $t_4$, that call would be routed by the routing engine 36 to ACD2 as ACD2 now has more agents (four agents) available than ACD1.

As mentioned, the communication processing center may also make use of a predictive algorithm to update the collected real-time data. It will be appreciated that the predictive algorithm may be based on various factors and may potentially be very elaborate or complex. One example of the use of a predictive algorithm is where carriers offer a service where only a subset of the total calls are pre-call routed. In such a system, the non pre-call routed calls are default routed based on a predetermined algorithm. If 33% of the calls are routed by the routing engine 36 and 67% default routed, then the business logic module 54 can use this information along with an understanding of the default algorithm to update the real-time data.

Using the previous example, where there are two ACDs and ACD1 has five available agents and ACD2 has four available agents; if at $t_2$ the routing engine 36 receives a route request, the routing engine 36 would select ACD1 on instruction from the business logic module 54. If the real-time data for ACD1 was decremented to indicate four agents are available, then this would not reflect the reality that two other calls were default routed. For this case, if the default algorithm alternated between the two ACDs, then the number of agents available on ACD1 should be decremented by two and the number of agents available on ACD2 should be decremented by one. The potential input to the predictive algorithm includes items such as agent schedules, historical trends, and the rate of completing calls as well as the application of probability theory. The rate of completing calls would be used to predict how many agents would become available during the time interval.

Figure 4:
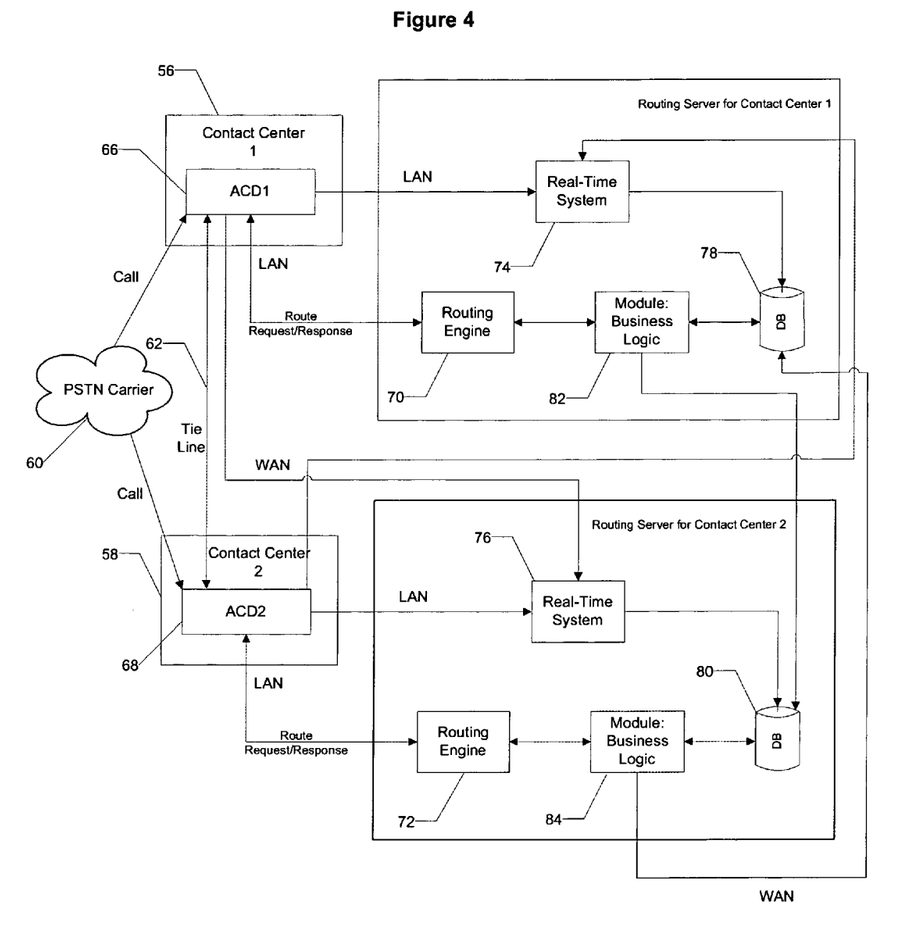
FIG. 4 is a block diagram illustrating a communication processing center configured to conduct post-call routing, according to a second exemplary embodiment of the present invention.

Turning now to FIG. 4, a second embodiment of a system according to the present invention is shown. In this embodiment a communication processing center is used for post-call routing in a contact center domain. Post-call routing entails routing a call after the call has arrived at a contact center's premise. The routing, in this case, entails connecting the call to an appropriate agent. If there is only one contact center, there are use cases for collecting real-time data on intervals. However, the more interesting case is when there are two or more contact centers and the contact centers support transferring calls between contact centers. As shown in FIG. 4, two contact centers are identified as contact center 56 and contact center 58. Contact center 56 needs to know the state of contact center 58 for the purposes of determining when it would be beneficial to transfer calls to contact center 58.

There are two mechanisms for transferring calls between contact centers. The first is a "take back and transfer" mechanism. After a call arrives at a contact center, the Public Switched Telephone Network (PSTN) carrier 60 is instructed by the data source or ACD for the contact center to take the call back and transfer it to another destination. The second mechanism is a tie line 62. A tie line connects two contact centers and provides for transferring calls between contact centers. A tie line could be a T1/T3 line(s) connecting contact centers or it could alternatively be a WAN connecting contact centers for the voice over IP case.

FIG. 4 shows one of the many variants for post-call routing architectures. For each contact center 56 and contact center 58, data sources or ACDs 66 and 68 respectively provide and feed data on regular and/or predefined intervals to respective routing engines 70 and 72 via respective data collectors. As with the first embodiment of the system, the data collectors are typically real-time systems (RTS) 74 and 76, which respectively store the collected real-time data in tables within respective memory devices, such as databases 78 and 80. Each database 78 and 80 contains data about both data sources, e.g., ACD1 66 and ACD2 68. The data contained in a database includes information on the longest available agent, queue lengths and average time to advance calls. When a call arrives at the ACD 66 for contact center 56, the ACD 66 sends a route request message to its routing engine 70. It will be appreciated that the ACDs 66 and 68 operate as communication sources in this embodiment of the invention. The routing engine 70 now forwards call information such as dialed number and automatic number identification (ANI) received from the carrier via the ACD to a graphical programming environment, such as a business logic module 82 that provides for programming business logic. The business logic module 82 uses the real-time data in the database 78 to make route decisions. In some cases, the business logic module 82 would indicate that the call should be sent over the tie line to contact center 58. Part of the business logic module 82 would update the real-time data based on a triggering event or a predictive algorithm. Each business logic module 82 and 84 updates the real-time data contained in the databases 78 and 80 for both contact centers 56 and 58.

In the exemplary embodiment, two database tables are required for pre-call routing purposes. The first table holds information that indicates which group should receive the call and the second table indicates the state of the ACDs.

The first table, i.e. Table 1, depicts the relationship between dialed numbers and the agent group that should receive the call. The agent group indicates the discipline within the specific contact center. For example, Agent Group 1 is sales, Agent Group 2 is customer support, and Agent Group 3 is billing. Depending on which number a customer dialed, the call is routed to an agent in the appropriate Agent Group for the specific type of call.

TABLE 1

Dialed Number to Agent Group Mapping

| Dialed Number | Agent Group ID |
| --- | --- |
| 8004443333 | 3 (Billing) |
| 8004441111 | 1 (Sales) |
| 8004442222 | 2 (Customer Support) |

Table 2 contains a set of fields that accommodates routing decisions. For example, referring to Table 1, if a customer dialed 8004441 1, the call is routed to an agent in Agent Group 1. Table 2 is now used to determine if the call should be handled by an agent on ACD1 or ACD2. Since ACD1 has 5 agents available in Agent Group 1 and ACD2 has 2 agents available in Agent Group 1, the call is sent to an agent on ACD1. As the routing of a call is a triggering event, the data relating to the number of agents available for Agent Group 1 on ACD1 should now be decremented by 1. The business logic module 54 is responsible for updating the tables.

In the event that no agents are available in an Agent Group, the lesser value of the product of "Queue Length" multiplied by the "Average Time to Advance" is used to select which ACD should receive the call.

TABLE 2

| ACD State | | | | |
|---|---|---|---|---|
| ACD | Agent Group ID | # Agents Available | Queue Length | Average Time to Advance (secs) |
| 1 | 1 | 5 | 0 | 300 |
| 1 | 2 | 0 | 8 | 502 |
| 1 | 3 | 0 | 15 | 734 |
| 2 | 1 | 2 | 0 | 320 |
| 2 | 2 | 0 | 6 | 450 |
| 2 | 3 | 0 | 18 | 700 |

In the following section an example of updating the real-time data based on a triggering event in a post-call routing architecture is given. As already described, contact center 56 is serviced by ACD1 66 and contact center 58 is serviced by ACD2 68. If a call arrives via the PSTN carrier 60 on ACD1 66, some analysis must occur to determine if that call can best be serviced by ACD1 66 or ACD2 68. This analysis entails the business logic module 82 looking at the collected real-time data for ACD1 66 and ACD2 68 stored in the databases 78 and 80 and selecting the destination that can best service the call. The real-time data would be gathered via the Real Time System (RTS) 74 and 76, and stored in the databases 78 and 80 that are resident on each routing server. Whenever a route decision is made by either of the business logic modules 82 or 84, the real-time data would be updated to reflect the route decision. This update of the real-time data is applied to the database for contact center 1 56 and the database for contact center 2 58. For example, if a call arrives on ACD1 66, and the routing engine 70 decides that the call should be routed to an agent on ACD1 66, then the real-time data stored in the databases 78 and 80 on the respective routing servers would be updated to reflect that one less agent is available on ACD1 66.

There are many approaches for updating the real-time between intervals based on predictive algorithms in a post-call routing environment. One example would be to correlate the activity on one contact center with the activity on another contact center. For example, referring again to FIG. 4 where contact center 1 56 has ACD1 66 and contact center 2 58 has ACD2 68. In the database 78 on the contact center 1 server, real-time data about ACD2 68 will be stored. Based on empirical analysis, correlating factors between the two ACDs can be determined. The analysis might indicate that the rate that agents become available or unavailable is similar for the two contact centers. In this system at time $t_0$ real-time data is collected from ACD2 68 and stored in the database 78 on the contact center 1 server. Also, at $t_0$ ACD1 66 has 10 available agents and ACD2 68 has five available agents. Now, if at $t_2$, ACD1 66 has eight available agents, then it could be inferred that ACD2 68 should have four available agents. Therefore, the real-time data for the number of agents available on ACD2 may be decremented by one based on this predictive algorithm.

Figure 5:
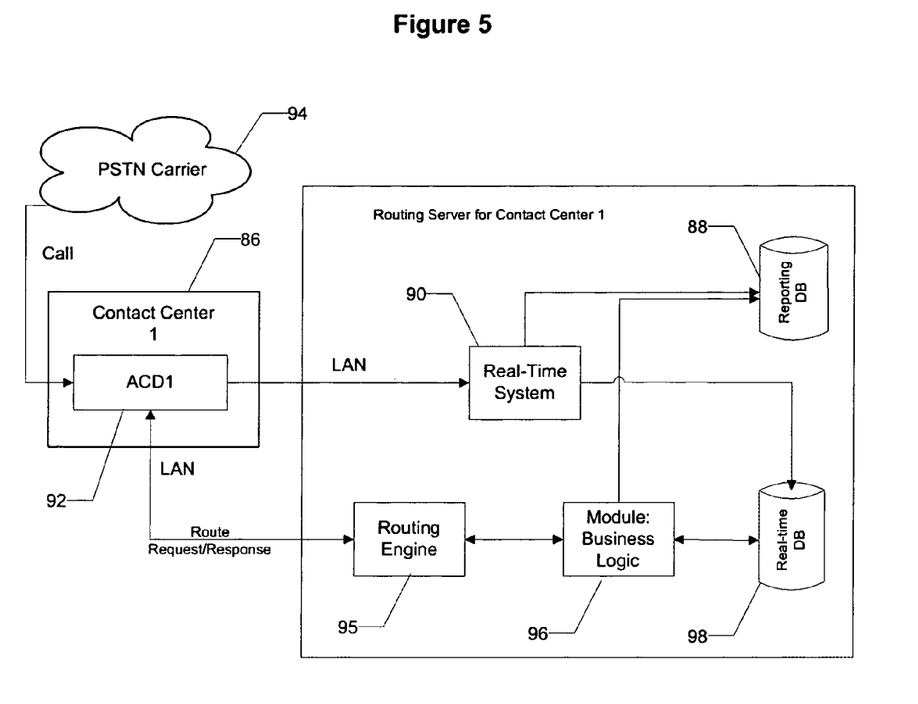
FIG. 5 is a block diagram illustrating a reporting data base that may be used with an exemplary embodiment of the invention.

In communication processing centers, in particular contact centers, reporting facilities provide both historical and real-time information about the state of the contact center. The methods of updating the reporting data are similar to those already discussed for pre- and post-call routing systems. FIG. 5 depicts a contact center 86, as an example of a communication processing center, which routes calls, as well as populates a reporting database 88. The reporting database 88 is updated at regular intervals via a real time system (RTS) 90 with information collected from data sources 92 such as Automatic Call Distributors (ACD). When a PSTN carrier 94 sends a call to an ACD 92, the ACD 92 prompts a routing engine 95 for a destination with a route request (e.g., which agent) for the call, and the routing engine 94 invokes a business logic module 96, which accesses a database 98 storing the collected real-time data received from the ACD 92 to determine which agent should receive the call. Once an agent has been selected by the business logic module 96, the business logic module 96 updates both the real-time database 98 and the reporting database 88 to reflect that one less agent is available. The business logic module 96 then returns the route decision back to the routing engine 94, which returns the decision back to the ACD 92. The ACD 92 then connects the call to the selected agent.

Updating reporting data based on a predictive algorithm is beneficial where centralized reporting across multiple contact centers is required. The centralized reporting server may be on a Local Area Network (LAN) for one of the contact centers. Typically, the other contact centers would use a Wide Area Network (WAN) to communicate with the reporting server. For example purposes, assume that ACD1 is on the same LAN as the reporting server, and ACD2 is remote and therefore uses the WAN to communicate with the reporting server. The data for ACD1 and ACD2 may be kept up-to-date via, for example, predictive algorithms discussed above with respect to post-call routing architectures. However, under certain circumstances it may be desirable to treat the data from ACD2 differently. One example of a circumstance where different updates may be required is with a sufficient latency of the WAN, which dictates longer polling intervals for ACD2 data. This latency may make updates across the WAN, as described under predictive algorithms in post-call routing architectures undesirable. For these circumstances a different predicative algorithm may provide certain benefits. The predictive algorithm may use information, such as the actual load on ACD1, the forecasted load on ACD1, the forecasted load for ACD2, and the agent schedules for ACD2 to predict the activity on ACD2. This prediction would be used to update the reporting data between intervals.

In this section some exemplary algorithms for updating the real-time data between intervals are described in more detail.

Pre-Call Routing Decisions—Whenever a pre-call routing application makes a routing decision, this information may be used to update the stored real-time data. If agents are available on the destination ACD selected by a routing engine, the number of available agents in the stored real-time data for that ACD is decremented by one. If no agents are available, then the data about the queue length for the destination ACD (shown in Table 2 above) is incremented by one.

For the case where the collected real-time data contains agent level information which is used to route a call to an agent, the collected real-time data may be updated whenever an agent is selected by the pre-call routing application. In using collected real-time data to select an agent, some constraints on how the pre-call routing application is configured may be necessary. One constraint is that there can only be one pre-call routing server making the route decisions. This is because if two servers were employed, both servers could potentially select the same agent at the same time. Redundancy can still be accommodated for by having one server active and the other on hot standby.

The other constraint may be that all calls going to the contact center must be pre-call routed. This may be necessary to ensure that an agent marked in the collected real-time data as available is not assigned a non pre-call routing call before the pre-call routed call arrived on the ACD. Within these constraints, the collected real-time data can be upgraded when a call is assigned to a particular agent.

Post-Call Routing Decisions—Whenever a post-call routed call is transferred to another ACD, the real-time data about the relevant ACD is updated in the real-time database to reflect this transfer. The example for updating the real-time data presented above for Pre-call routing decisions is also valid for post-call routing.

ACD Metrics—There are many ACD metrics that may be used to update the real-time data. Some examples are average handle time, average time to advance calls in the queue and average speed of answer. These and other similar metrics provide insight into the rate at which calls are being processed through the contact center. If this information is available, it can be used to update the collected real-time data between collection intervals. For example, knowing the average time to advance calls in a queue and knowing the number of calls in the queue, the queue length may be adjusted as time progresses between the intervals. For example, if at to there are 20 calls in queue and the average time to advance calls is 5 seconds, then at $t_5$ the real-time data for the queue length could be decremented by one. Additional, the rate of receiving calls along with the average time to advance calls could be used to determine the net increase/decrease of the queue length between intervals Trends Based on Interval Data—The collected real-time data itself provides trend information that can be used to update the real-time data between intervals. For example, looking at how the queue length has changed over the last five intervals provides insight into how the queue length is likely to change within the current interval. Where "I" indicates an interval and the queue lengths are $I_0=30$, $I_1=28$, $I_2=27$, $I_3=25$, and $I_4=23$, it follows that for $I_5$, the queue length may be adjusted down based on the trend.

Carrier Routing Algorithms—As mentioned above with reference to the predictive algorithm in pre-call routing systems, some carriers offer a service where only a subset of the total calls are pre-call routed. The non pre-call routed calls are default routed based on a predetermined algorithm. The real-time data may be updated, between intervals, based on an understanding of the carrier's default routing algorithms.

Agent Schedule Information—Work force management applications maintain agent schedules. Knowing agents' schedules may be beneficial in updating the real-time data between intervals. For example, if it is known that 20 agents are scheduled to go on break, then this information may be used to update the number of available agents.

Work Load Forecast—Work force management applications maintain a workload forecast. Knowledge of the forecast may be used to predict changes in the real-time data between intervals. For example, if the next 30 minutes is forecasted to have a much higher workload, then this information along with trend analysis may be used to update the real-time data.

IVR State Information—Interactive Voice Recognition (IVR) systems provide a way for the caller to acquire information without actually talking to an agent. IVR systems usually consist of a series of menus that the customer navigates, which hopefully provides the caller with the desired information. Some portion of the callers will become frustrated and opt out of the IVR. When they opt out, they are normally transferred to an agent. A factor that is pertinent in predicting how many callers will opt out is where the callers are in the menu structure. For example, if a caller is near the beginning of the menu structure, it is less likely the caller will opt out. If the caller is deep into a very complicated menu structure, it is more likely that the caller will become frustrated and opt out. The actual dropout rates at various points in the menu structure are implementation dependant and may be determined empirically. The number of calls in the IVR, the position of the calls, and the typically opt out rates for those positions may be used to predict how many callers will opt out within an interval. With this information, the queue length can be adjusted between intervals to reflect that the opted out calls would be placed in a queue to be answered by an agent.

Correlating Factors—There are situations where correlating factors can be utilized to update the real-time data between intervals. An example of this is where there are two ACDs and the real-time data is known in real-time for ACD1 and real-time data is collected on intervals for ACD2. If there is a correlation between the activity on ACD1 and ACD2, then the activity on ACD1 may be used to update, between intervals, the data for ACD2.

Probability Theory—The application of probability theory is viable for updating the real-time data between intervals. Probability theory may be used in conjunction with many of the previously mentioned methods of updating the real-time data between intervals. For example, Carrier Routing Algorithms, as discussed above, provide a case where the carrier has an algorithm for default routing calls. In many cases it would not be possible to predict which ACD would be selected by the default route. If ACD1 receives 75% of the default routed calls and ACD2 receives 25% of the default routed calls, then the real-time data may be updated, between collection intervals, using probability theory to achieve the desired overall mix.

Figure 6:
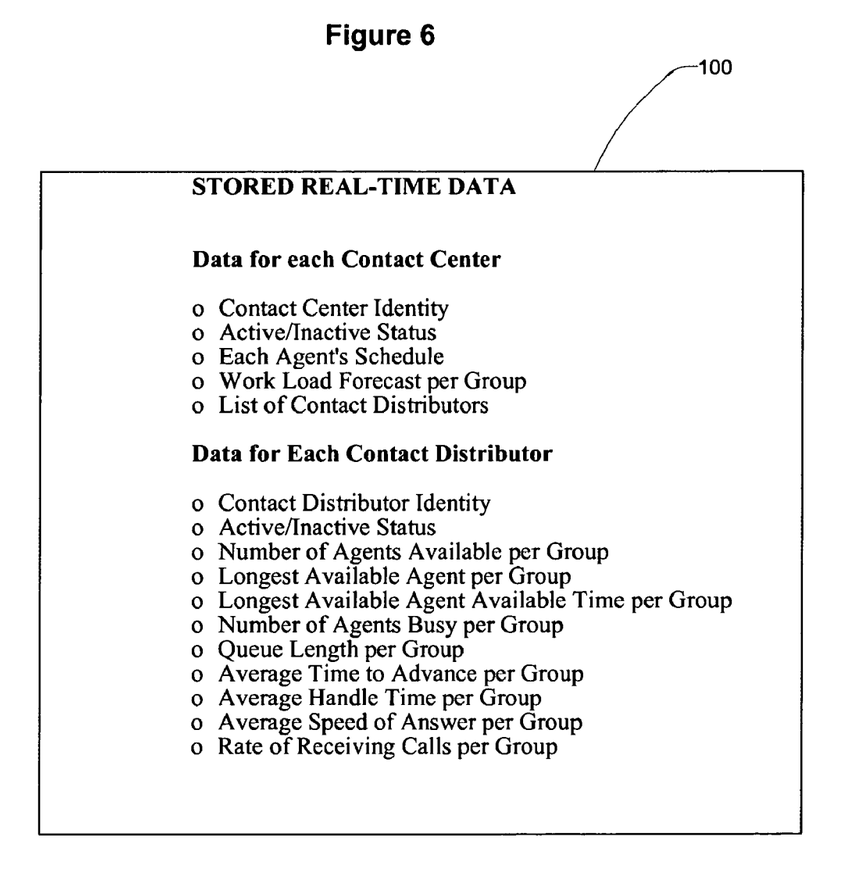
FIG. 6 is a block diagram illustrating data architecture of information stored on the database according to an exemplary embodiment of the present invention.

FIG. 6 shows the data architecture of the data stored in the real-time database, according to one exemplary embodiment on the present invention. The information that is stored in this database may include information received from the data source or ACDs. This information, as mentioned before, relates to the availability of aspects of a communication network related to a contact center, and includes the longest available agent, queue lengths and average time to advance calls associated with a particular data source. Other real-time data may also be stored on the database, in particular where such information is needed to use a predictive algorithm. In general the real-time data provides information for each group on the rate calls are arriving, the time to handle a call, the number of calls in queue, and the time to advance a call in a queue. Additionally, information about the forecasted work load per group and agents' schedules is particularly beneficial in predictive algorithms.

Figure 7:
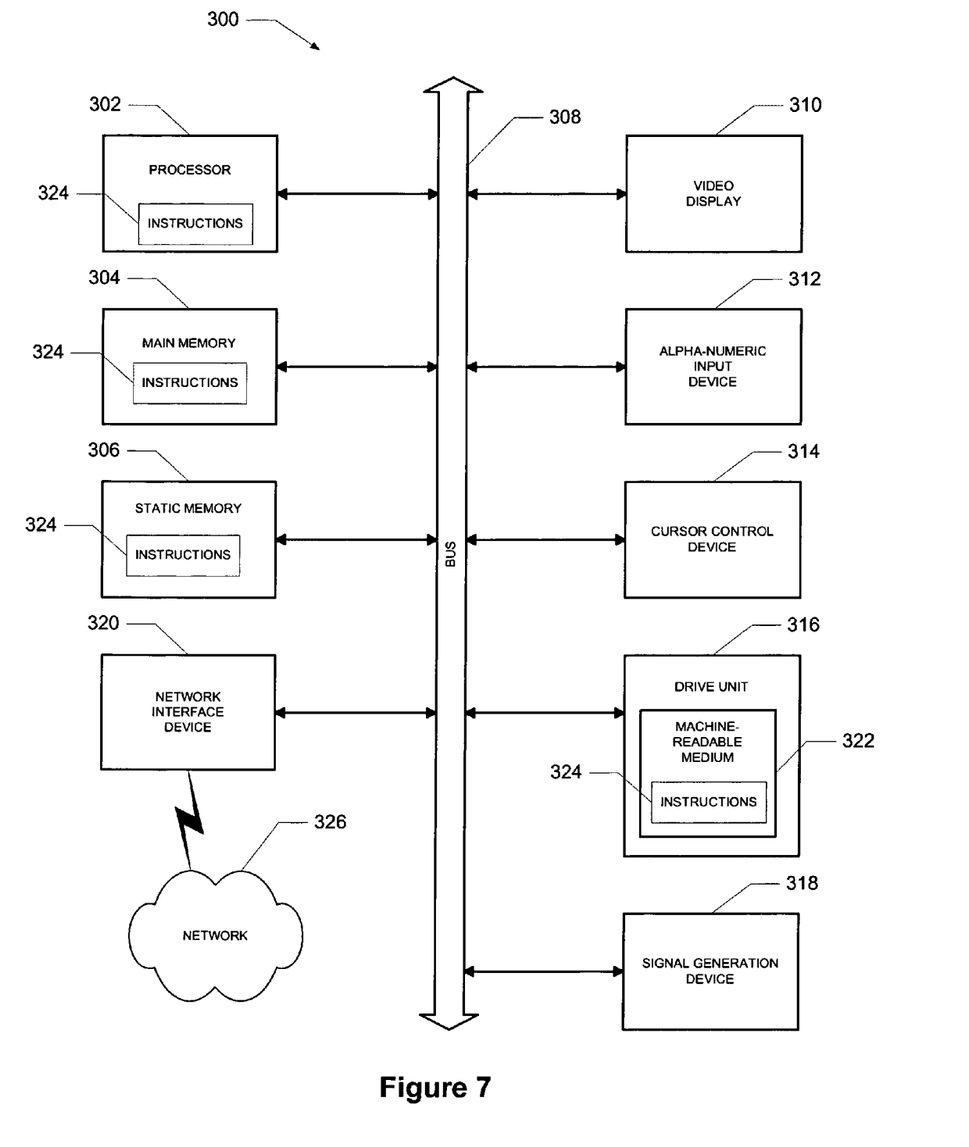
FIG. 7 is a block diagram showing a machine for performing any one of the exemplary methods described herein.

FIG. 7 shows a diagrammatic representation of machine, in the exemplary form of a computer system 300, within which a set of instructions for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for updating real-time data between intervals in a communication processing center having a plurality of data sources and a data collector, the method including:
    receiving, by the data collector, real-time data at pre-defined intervals from the plurality of data sources, the real-time data including information regarding availability of aspects of a communication network;
    storing the received real-time data in a memory;
    detecting occurrence of a specified triggering event between the pre-defined intervals; and
    updating, between the pre-defined intervals, the received stored real-time data automatically in response to detecting the triggering event by replacing the received stored real time data with calculated update data calculated based on information relating to the specified triggering event.

2. The method of claim 1 wherein the receiving, by the data collector, of the real-time data at intervals from at least one of the data sources further includes receiving real-time data at pre-defined time intervals from the data source, with the data source including a publishing module which automatically pushes the real-time data to the data collector at the pre-defined time intervals from the data source and the data collector including a subscription module.

3. The method of claim 1 wherein the receiving, by the data collector, of the real-time data at intervals from the data sources further includes collecting data at pre-defined time intervals from the data sources, with the data collector including a polling module to pull the real-time data from the data source at the pre-defined intervals.

4. The method of claim 1 further comprising receiving a communication routing request from a communication source and routing a communication to an agent in response, and updating the stored real-time data including agent availability data in response the routing to the agent.

5. The method of claim 4 further comprising sending a communication routing decision, based on the updated stored real-time data, from a routing engine to the communication source.

6. The method of claim 5 wherein the communication routing decision from the routing engine to the communication source is the specified triggering event.

7. A non-transitory machine-readable medium comprising instructions, which when executed by a machine, cause the machine to perform a method for updating real-time data between intervals in a communication processing center having a plurality of data sources, each having a plurality of associated agents, and a data collector, the method including:
    receiving, by the data collector, real-time data at pre-defined intervals from the plurality of data sources, the real-time data including information regarding available agents of the plurality of agents;
    storing the received real-time data in memory means;
    detecting occurrence of a call routing event between the intervals; and
    updating, between the intervals, the received stored real-time data automatically in response to detecting a call routing event by replacing the received stored real-time available agent data with a calculated update of available agent data calculated based on the call routing event.

8. The non-transitory machine-readable medium of claim 7 wherein the receiving, by the data collector, of the real-time data at intervals from the data sources further includes automatically receiving real-time data at pre-defined time intervals from the data sources, with the data sources including a publishing module and the data collector including a subscription module.

9. The non-transitory machine-readable medium of claim 7 wherein the receiving, by the data collector, of the real-time data at intervals from a data source further includes collecting data at regular or pre-defined time intervals from the data source, with the data collector including a polling module to collect the real-time data.

10. The non-transitory machine-readable medium of claim 7 wherein the method further includes receiving a communication routing request from a communication source.

11. The non-transitory machine-readable medium of claim 10 wherein the method further includes sending a communication routing decision from a routing engine to the communication source.

12. A system for updating real-time data between intervals in a communication processing center, the system including:
    a plurality of data sources to provide real-time data at pre-defined intervals, the data including information on availability of aspects of the communication network;
    a plurality of data collectors, each respective data collector configured to receive the real-time data from at least one corresponding data source of the plurality of data sources;

a plurality of databases, each respective database coupled to a respective data collector to store the received real-time data of the respective data collector; and
a module to
detect occurrence of a specified triggering event between the intervals, and
update, between the intervals, the received stored real-time data in each database automatically in response to detecting the triggering event by replacing the received stored real-time data with update data calculated based on information relating to the triggering event.

13. The system of claim 12 further comprising a routing engine to receive a communication request from a communication source.

14. The system of claim 13 wherein the routing engine is to route a communication decision based on the updated stored real-time data to the communication source.

15. The system of claim 12 wherein at least one data source includes a publishing module and at least one data collector includes a subscription module automatically to send the real-time data from the data source, and automatically to receive the real-time data by the data collector.

16. The system of claim 15 wherein at least one data collector includes a polling module to collect data at regular or pre-defined time intervals from the data source.

17. The system of claim 12 wherein at least one data source is an automatic call distributor.

18. The system of claim 12 wherein the data collectors are a real time system.

19. The system of claim 12 wherein the database comprises a table of agent group assignment information and a table of automatic contact distribution state information.

20. The system of claim 12 wherein the module includes a graphical programming environment.

21. The system of claim 12 wherein the communication source is one of a Public Switched Telephone Network carrier and an automatic call distributor.

22. A system for updating real-time data between intervals in a communication processing center, the system including:
first means for collecting real-time data at periodic times from a plurality of data sources, the data including information on availability of aspects of the communication network;
second means for receiving the real-time data from the first means;
third means for storing the received real-time data; and
fourth means for detecting occurrence of a specified triggering event between the periodic times, and
updating, between the periodic times, the received stored real-time data automatically in response to detecting the triggering event by replacing the received stored real-time data with calculated update data calculated based on information relating to the triggering event.

23. The system of claim 22 further comprising fifth means for receiving a communication request from a communication source.

24. The system of claim 22 wherein the fifth means is for routing a communication decision based on the updated stored real-time data to the communication source.

25. The system of claim 22 wherein at least one of the data sources includes a publishing module and the first means includes a subscription module for automatically sending the real-time data by the data source, and for automatically receiving the real-time data by the second means.

26. The system of claim 22 wherein the first means includes a polling module for collection data at regular or pre-defined time intervals from the data sources.

27. A method for updating real-time data between intervals in a communication processing center having a plurality of data sources and a data collector, the method including:
receiving, by the data collector, real-time data at pre-defined intervals from the plurality of data sources, the real-time data including information on availability of aspects of a communication network;
storing the received real-time data in a memory; and
updating, between the intervals, the received stored real-time data automatically by replacing the received stored real-time data with calculated update data calculated based on a predictive algorithm.

28. The method of claim 27 wherein the receiving, by the data collector, of the real-time data at intervals from at least one of the data sources further includes automatically receiving real-time data at regular or pre-defined time intervals from the data source, with the data source including a publishing module and the data collector including a subscription module.

29. The method of claim 27 wherein the receiving, by the data collector, of the real-time data at intervals from the data sources further includes collecting data at pre-defined time intervals from the data sources, with the data collector including a polling module to collect the real-time data.

30. The method of claim 27 further including receiving a communication routing request from a communication source in a pre-call routing system and wherein the predictive algorithm uses percent of pre-call routed calls and percent of default routed calls to update the stored real time data.

31. The method of claim 30 further including sending a communication routing decision from a routing engine to the communication source.

32. The method of claim 27 wherein the predictive algorithm utilizes at least one of the following parameters: metrics of the data source, trends relating to the stored real-time data, carrier routing algorithms, availability aspects of the communication processing center, and communication routing decisions from the routing engine to the communication source.

33. A non-transitory machine-readable medium comprising instructions, which when executed by a machine, cause the machine to perform a method for updating real-time data between intervals in a communication processing center having a plurality of data sources and a data collector, the method comprising:
receiving, by the data collector, real-time data at pre-defined intervals from the plurality of data sources, the real-time data including information on availability of aspects of a communication network;
storing the received real-time data in a memory; and
updating, between the intervals, the received stored real-time data automatically by replacing the received stored real-time data with calculated update data calculated based on a predictive algorithm.

34. The non-transitory machine-readable medium of claim 33 wherein the receiving, by the data collector, of the real-time data at intervals from the data sources further includes automatically receiving real-time data at regular or pre-defined time intervals from the data sources, with the data sources including a publishing module and the data collector including a subscription module.

35. The non-transitory machine-readable medium of claim 33 wherein the receiving by the data collector, of the real-time data at intervals from a data source further includes collecting data at regular or pre-defined time intervals from the data source, with the data collector including a polling module to collect the real-time data.

36. The non-transitory machine-readable medium of claim 33 wherein the method further includes receiving a communication routing request from a communication source, and wherein the predictive algorithm uses correlation of activity on one contact center with activity of another contact center to calculate the update data.

37. The non-transitory machine-readable medium of claim 36 wherein the method further includes sending a communication routing decision from a routing engine to the communication source.

38. A system for updating real-time data between intervals in a communication processing center, the system including:
   a plurality of data sources to periodically provide real-time data at a pre-defined interval, the data including information regarding availability of aspects of the communication network;
   a data collector to receive the real-time data from the data sources;
   a memory to store the received real-time data; and
   a module to update, between the intervals, the received stored real-time data automatically by replacing the received stored real-time data with calculated update data calculated based on a predictive algorithm.

39. The system of claim 38 further including a routing engine to receive a communication request from a communication source.

40. The system of claim 38 wherein the routing engine is to route a communication decision based on the updated stored real-time data to the communication source.

41. The system of claim 38 wherein the data sources include a publishing module and the data collector includes a subscription module to automatically send the real-time data from the data sources, and to automatically receive the real-time data by the data collector.

42. The system of claim 38 wherein the data collector includes a polling module to collect data at pre-defined time intervals from the data sources.

43. The system of claim 38 wherein at least one data source is an automatic call distributor.

44. The system of claim 38 wherein the data collector is a real time system.

45. The system of claim 38 wherein the system includes at least two contact processing centers and the predictive algorithm correlates activity of one of the contact centers with another one of the contact centers.

46. The system of claim 38 wherein the module includes a graphical programming environment.

47. The system of claim 38 wherein the communication source is at least one of a Public Switched Telephone Network carrier and an automatic call distributor.

48. The system for updating real-time data between intervals in a communication processing center, the system comprising:
   first means for collecting real-time data at pre-defined intervals from a plurality of data sources, the data including information regarding availability of aspects of the communication network;
   second means for receiving the real-time data from the first means;
   third means for storing the received real-time data; and
   fourth means for updating, between the intervals, the received stored real-time data automatically by replacing the received, stored real-time data with calculated update data calculated based on a predictive algorithm.

49. The system of claim 48 further comprising fifth means for receiving a communication request from a communication source.

50. The system of claim 48 wherein the fifth means is for routing a communication decision based on the updated stored real-time data to the communication source.

51. The system of claim 48 wherein at least one of the data sources includes a publishing module and the first means includes a subscription module for automatically sending the real-time data from the data source, and for automatically receiving the real-time data by the second means.

52. The system of claim 48 wherein the first means includes a polling module for collecting data at regular or pre-defined time intervals from the data sources.

* * * * *